United States Patent Office 3,185,500
Patented May 25, 1965

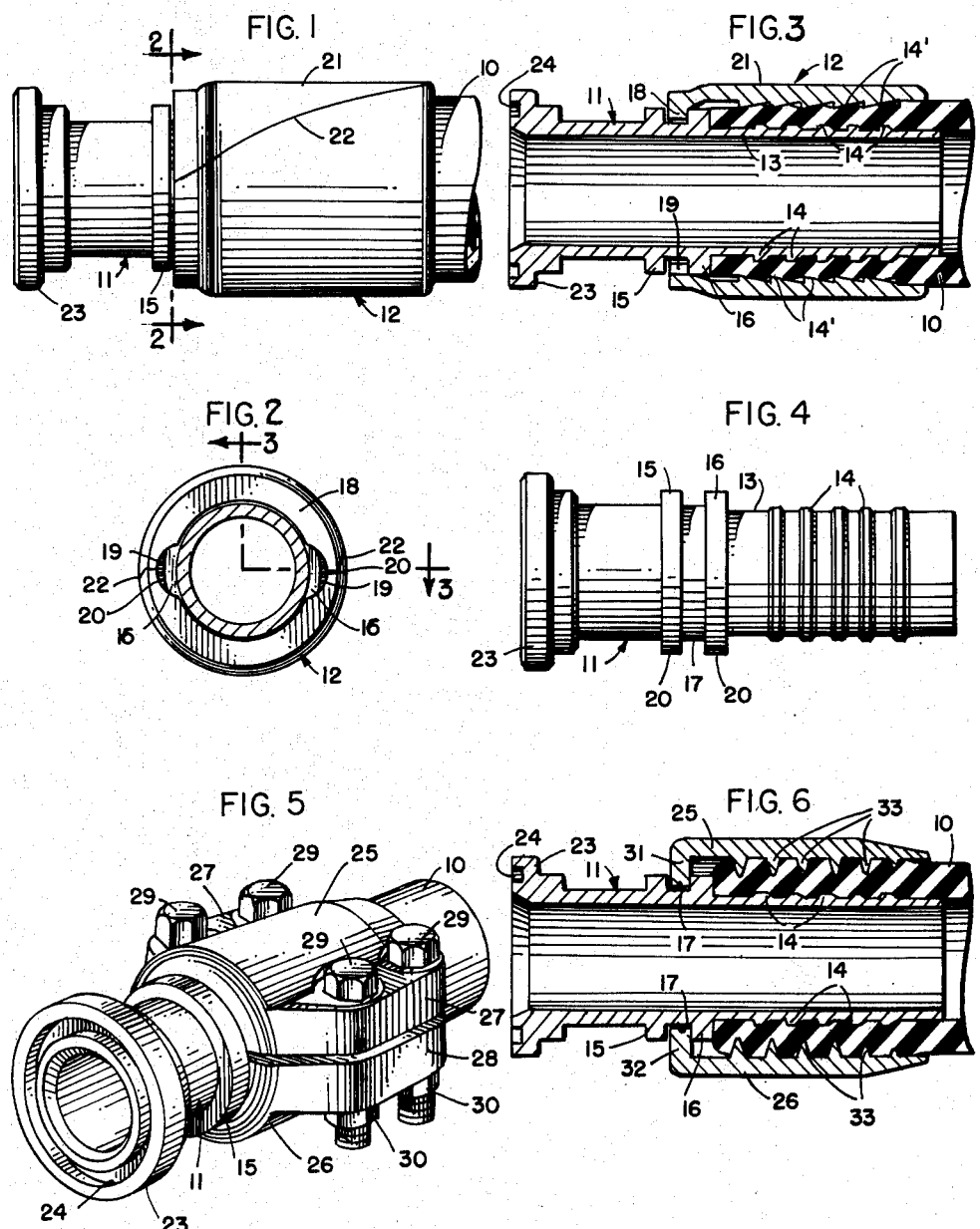

3,185,500
PRESSED-ON TUBE COUPLING HAVING DISASSEMBLY MEANS
Roger R. Luther, Zion, Ill., assignor to Anchor Coupling Company, Inc., Libertyville, Ill., a corporation of Illinois
Filed Nov. 5, 1962, Ser. No. 235,240
4 Claims. (Cl. 285—4)

This invention relates to couplings for tubes, hoses, etc., and, more particularly, pertains to improvements in coupling structures facilitating removal of the coupling sleeve or shell from the end of a rubber or rubber-like flexible tube, hose, etc.

The couplings of this invention pertain to swaged or pressed-on type couplings in which the outer shell or sleeve of the coupling is pressed inwardly by special machinery to fix a shell or sleeve on an inner mandrel or insert with the end of a tube or hose clamped therebetween. Swaged or pressed-on couplings are excellent couplings for rubber or rubber-like tubes, hoses, etc. One of their main shortcomings, however, of prior known swaged couplings is the difficulty encountered in removing the coupling from a damaged tube, hose, etc., without destroying or rendering useless the inner parts of the coupling. This invention pertains to swaged or pressed-on type couplings in which the outer sleeve or shell of the coupling is structurally adapted to be removed without damage to the inner mandrel or insert, whereby the latter can be reused.

It is, therefore, a primary object of this invention to provide swaged or pressed-on type coupling structures in which the outer shell or sleeve of the coupling may be split for removal thereof without damage to the mandrel or insert. Another object of the invention is to provide swaged couplings in which the outer shell or sleeve may be sawed to remove the same from its gripping relationship about a hose, tube or the like and a mandrel or insert constituting the inner part of the coupling without damage to the latter. A still further object of the invention is to provide couplings with a swaged outer shell or sleeve having notches or recesses in an inwardly-extending lip thereof, which lip is seated in a groove in the inner mandrel or insert, the depth of said notches or recesses being sufficient so that the wall of the outer sleeve or shell can be sawed through on lines intersecting said notches for removal of the sleeve or shell without sawing the portions of said mandrel or insert adjacent said groove.

The foregoing and numerous other important objects, advantages, and inherent functions of the invention will become apparent as the same is more fully understood from the following description, which, taken in connection with the accompanying drawings, discloses a preferred embodiment of the invention.

In the drawings:

FIG. 1 is a side elevation of an embodiment of an assembled swaged or pressed-on coupling of the invention;

FIG. 2 is a sectional view taken on a diametric plane of said embodiment;

FIG. 3 is a sectional view taken on section 3—3 of FIG. 2;

FIG. 4 is a side elevation of the insert or mandrel of said embodiment;

FIG. 5 is a perspective view of an embodiment of an assembled, replacement coupling with a split-collar mounted on the mandrel or insert of said embodiment; and FIG. 6 is a sectional view taken on a diametric section of the embodiment of FIG. 5.

Referring to the drawings, there is shown a flexible hose, tube or the like 10, the end of which tightly gripped between a hollow, cylindrical, coupling insert or mandrel 11 and a hollow, cylindrical swaged or pressed-on coupling sleeve 12. The hose, tube or the like 10 may be made of natural or synthetic rubber or other flexible synthetic resins, which may or may not be reinforced by wire or fabric reinforcing mesh or braid. The metal insert or mandrel 11 comprises a cylindrical portion 13 over which the end of the hose or tube 10 is positioned. The outer wall of portion 13 and the inner wall of the sleeve or shell 12 each have a plurality of annular teeth, ribs or rings 14 and 14' serving as gripping members against the inner and outer sides of hose or tube 10. The metal insert or mandrel 11 also has a pair of closely spaced, parallel annular ribs or rings 15, 16 on the outer side forming an annular groove 17 around the mandrel. Where the wall of the mandrel is sufficiently thick to permit cutting a groove like groove 17 in the outer wall without impairing the structural strength of the mandrel or insert 11, the rib or ring 15 may be omitted.

The groove 17 receives the inwardly-extending, annular, ring-shaped lip 18 of the metal swaged or pressed on sleeve or shell 12. The lip 18 is swaged into groove 17 in the swaging operation. The lip-groove arrangement is employed to prevent axial displacement of the sleeve or shell 12 relative to insert or mandrel 11.

The lip 18 has two (or more if desired) notches or recesses 19 in its inner edge. In the case of two notches or recesses 19, they are spaced apart about 180° as shown in the case of the diametrically opposed notches or recesses 19 of the illustrated embodiment. The depth of said notches or grooves is sufficient so that the radii from the longitudinal axis of said coupling to the deepest part thereof is at least equal to the radius from said axis to the outer part of the mandrel or insert adjacent groove 17. In the illustrated case, the last-mentioned radius is the radius to the outer edges 20 of ribs or rings 15, 16, or the larger of the two radii if the ribs or rings 15, 16 are of different diameters.

This permits sawings completely through the cylindrical wall 21 of the outer shell or sleeve 11 along saw guide marks or lines 22 so that the shell or sleeve may be severed into two halves without penetration of the saw teeth into the outer sides 20 of ribs or rings 15 and/or 16.

The saw guide lines 22 intersect the approximate center of notches 19 (their deepest point) and extend therefrom at an acute angle with respect to the longitudinal axis of the coupling. While they are curved by the contour of the rounded surface of the hollow sleeve or shell 12, the guide lines 22 are, in projection, straight lines along which the straight edge of a saw moves in the sawing process. The guide lines 22 may be notch-intersecting lines parallel with the axis of the insert or mandrel 11, if desired, but the angular positioning is preferred so that the saw moves in a reciprocal path which avoids interference with saw movement by the hose or tube 10, flange 23, or other parts of the coupling.

The guide lines 22 may be printed lines or other line surface marking. The preferred practice, however, is to emboss, mold, or cut the guide lines 22 in the form of indentation lines in the outer surface of the hollow cylindrical portion 21. Embossing may be done with dies or other suitable pressing means which emboss the guide lines 22 into the surface during the swaging operation.

When the wall of sleeve or shell 11 is sawed through at two places, the outer sleeve or shell 12 drops off. The undamaged hollow insert or mandrel 11 then may be removed from the defective hose or tube. It can be reused in another swaged or pressed-on coupling of the character described with another hose or tube 10, or, where on-the-job replacement of the defective hose or tube and the coupling is necessary, the mandrel or insert 11 can be used with a split sleeve or shell coupling of the character shown in FIGS. 5 and 6.

The coupling of FIGS. 5 and 6 comprises the hollow mandrel or insert 11 and semi-cylindrical half sections 25, 26 forming a hollow, split sleeve or shell around the mandrel 11 and the end of a flexible hose or tube 10 mounted thereover. The half sections 25, 26 have, respectively, oppositely-disposed, outwardly-extending ears 27, 28 having aligned pairs of holes through which extend bolts 29. When nuts 30 are drawn up tightly on bolts 29, the split sleeve or shell halves are drawn tightly around hose or tube 10 to clamp the latter between the split sleeve or shell and the mandrel or insert 11. The half sections 25, 26 have, respectively, semi-cylindrical, inwardly-extending lips 31, 32 which seat in groove 17 of the mandrel or insert 11. The half sections also have on their inner walls semi-circular teeth or ribs 33 which bite into the outer side of hose or tube 10.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A coupling comprising a hollow coupling insert mounted inside an end of a tube, said insert having beyond the end of said tube an annular peripheral groove in its outer wall, the surfaces adjacent said groove having a substantially equal outer diameter, a hollow, annular coupling sleeve about said end of said tube, the wall of said sleeve being deformed permanently about said end of said tube and tightly clamping said end of said tube between said insert and said sleeve, an integral, annular, inwardly extending lip on said sleeve, said lip having an inner edge, said lip being deformed into said groove in permanent seating relationship therewith, said lip having an axial thickness substantially equal to the axial width of said groove, and said inner edge of said lip having at least two angularly-spaced notches, the radii from the longitudinal axis of said coupling to said inner edge at the respective, deepest points of said notches being at least as large as the radius of the outer edges of said groove whereby said sleeve can be split longitudinally by sawing along lines respectively intersecting said notches without sawing into said insert when said coupling is to be dismantled.

2. A coupling as claimed in claim 1, and a pair of spaced ribs extending around the outer wall of said insert and defining therebetween said peripheral groove.

3. A coupling as claimed in claim 1 wherein said notches are diametrically opposite each other.

4. A coupling as claimed in claim 1, and cutting guide lines on the outer surface of said sleeve, said guide lines extending between opposite ends of said sleeve and respectively intersecting said notches.

References Cited by the Examiner

UNITED STATES PATENTS

| | | | |
|---|---|---|---|
| 1,331,923 | 2/20 | Imback | 285—259 |
| 2,086,703 | 7/37 | Eastman | 285—3 |
| 2,314,236 | 3/43 | Mott | 285—259 |
| 2,452,728 | 11/48 | Carling | 285—256 |
| 2,476,480 | 7/49 | Burckle | 285—93 |
| 2,790,654 | 4/57 | Cox | 285—251 |
| 2,872,839 | 2/59 | Valentine | 285—4 |
| 3,096,876 | 7/63 | Scudieri | 29—427 X |
| 3,142,502 | 7/64 | Luther | 285—259 X |

FOREIGN PATENTS 1,249,979  11/60  France.

CARL W. TOMLIN, *Primary Examiner.*

THOMAS F. CALLAGHAN, *Examiner.*